(12) United States Patent
Vronsky et al.

(10) Patent No.: US 8,100,660 B2
(45) Date of Patent: Jan. 24, 2012

(54) WIND TURBINE BLADE LOAD SENSOR

(75) Inventors: Tomas Vronsky, Woolston Southampton (GB); Andrew Hedges, Southampton (GB)

(73) Assignee: Vestas Wind Systems A/S, Aarhus N (DK)

( * ) Notice: Subject to any disclaimer, the term of this patent is extended or adjusted under 35 U.S.C. 154(b) by 473 days.

(21) Appl. No.: 12/357,891

(22) Filed: Jan. 22, 2009

(65) Prior Publication Data

US 2009/0129925 A1     May 21, 2009

(30) Foreign Application Priority Data

Oct. 31, 2008   (GB) .................................. 0819988.7

(51) Int. Cl.
B63H 1/26          (2006.01)
(52) U.S. Cl. .......... 416/224; 416/31; 416/61; 416/229 R
(58) Field of Classification Search ............... 416/31, 416/33, 37, 44, 231 B
See application file for complete search history.

(56) References Cited

U.S. PATENT DOCUMENTS

| | | | |
|---|---|---|---|
| 4,429,579 A | 2/1984 | Wilhelm | |
| 5,392,654 A | 2/1995 | Boyle | |
| 7,086,834 B2 | 8/2006 | Le Mieux | |
| 7,160,083 B2 | 1/2007 | Pierce et al. | |
| 2002/0000723 A1 | 1/2002 | Weitkamp | |
| 2005/0231377 A1 | 10/2005 | Sunderman et al. | |
| 2007/0253819 A1* | 11/2007 | Doorenspleet et al. | ... 416/134 A |
| 2010/0052320 A1* | 3/2010 | Hoffmann | ...................... 290/44 |

FOREIGN PATENT DOCUMENTS

| | | |
|---|---|---|
| EP | 1 359 321 A1 | 11/2003 |
| EP | 1 230 479 B1 | 9/2004 |
| EP | 1 780 523 A1 | 5/2007 |
| GB | 1162926 | 9/1969 |
| GB | 2 328 022 A | 2/1999 |
| JP | 2004301030 A | 10/2004 |
| WO | WO 01/33075 A1 | 5/2001 |
| WO | WO 0133075 | 5/2001 |
| WO | WO 2007/006301 A1 | 1/2007 |
| WO | WO 2007/093854 A2 | 8/2007 |
| WO | WO 2008/046881 A2 | 4/2008 |
| WO | WO 2008/101496 A2 | 8/2008 |

* cited by examiner

*Primary Examiner* — Cheung Lee
(74) *Attorney, Agent, or Firm* — Wood, Herron & Evans, L.L.P.

(57) ABSTRACT

A wind turbine rotor blade root load sensor includes an insert secured within a root portion of a wind turbine rotor blade and including an internal bore. The sensor also includes a carrier member fixedly connected to the internal bore of the insert so that loads can be transmitted therebetween. The sensor further includes a sensing element supported by the carrier member within the internal bore of the insert. The sensing element is positioned to detect loads applied to the wind turbine rotor blade and transferred through the insert and the carrier member.

13 Claims, 1 Drawing Sheet

WIND TURBINE BLADE LOAD SENSOR

TECHNICAL FIELD

The present invention relates to a wind turbine rotor root load sensor, in particular a sensor which is configured to be mounted within material of a root portion of a wind turbine rotor.

BACKGROUND

Wind turbine rotor blades experience a significant level of dynamic loading during operation of the wind turbine installation to which the, or each, rotor blade is connected in use. Not only is the rotor blade rotated about an axis of a hub of the wind turbine installation such that the loading due to the weight of the rotor blade is constantly changing but the wind turbine installation is subjected to significantly varying forces due to variation in the wind loading exerted thereon.

The pitch of respective blades may be changed as necessary, for example to enhance the lift generated by the rotor blade in particular wind conditions. It is also desirable to control the pitch of the blades to minimise the impact of extreme loads that can be experienced by the blade, for example during gusting winds.

Rotor blades may be monitored during operation to track loading experienced by each respective blade and the hub, both in terms of aerodynamic forces and weight forces exerted thereon.

Structural health monitoring of the wind turbine installation can also be performed as loading on the rotor blades occurs. A history of loading experienced by the rotor blade can be ascertained and this history can be used to estimate the fatigue life and current structural status of the rotor blades so that failure of the blades can be avoided.

Conventionally, monitoring is undertaken by placing load sensors on a surface of a shell of the rotor blade. Sensors can be mounted on an external surface of the shell, in which case the sensors are exposed to the environment and may experience deterioration as a consequence. Alternatively, the sensors may be placed on an inner surface of the shell where they would be protected from the environment. However, sensors located in this way may still be damaged during maintenance of the wind turbine. Furthermore, accurate placement of the sensors is difficult to achieve and such inaccuracies may lead to erroneous data being collected.

It is desirable to provide a sensor which overcomes some of the aforementioned disadvantages thus improving the accuracy of monitoring of loads to which the rotor blade is exposed.

SUMMARY

According to a first aspect, the present invention provides a wind turbine rotor blade root load sensor configured to be internally mounted within an insert of a root portion of a wind turbine rotor, the sensor comprising:
- a carrier member configured to be fixedly connected to the insert so that loads can be transmitted therebetween; and
- a sensing element, supported by the carrier member.

By providing a load sensor, mountable within the material of the rotor blade itself, in particular within an insert, which is typically made from a high stiffness material, accurate load monitoring can be undertaken. Placement of the sensors becomes predictable and accurate and the sensing element is effectively protected so that deterioration of the load sensor is inhibited.

The sensing element may be embedded within the carrier member, thereby achieving protection of the sensing element. The carrier member may be substantially cylindrical. Alternatively, the carrier member may be tapered. An outer surface of the carrier member may comprise a threaded portion, thus enabling a secure interface to be achieved between the sensor and an insert in which the sensor is located. It follows that accurate measurements can therefore be collected.

According to a second aspect, the present invention provides a wind turbine rotor blade comprising a root portion and a tip portion extending from the root portion, wherein the root portion comprises an insert configured to receive a fixing member to secure the blade to a rotor hub, wherein the insert is configured to receive an aforementioned sensor, for detecting loads experienced by the root portion of the rotor blade.

The aforementioned wind turbine rotor blade may be provided in combination with the aforementioned sensor. The sensor may be permanently mounted within the insert e.g. by bending or a friction fit. Alternatively, the sensor may be removably mounted within the insert, for example using a threaded interface.

According to a third aspect, the present invention provides a wind turbine installation comprising:
- a tower;
- a hub mounted atop the tower; and
- a rotor blade of the aforementioned type, connected to the hub by at least one bolt, the bolt engaging the insert.

BRIEF DESCRIPTION OF THE DRAWINGS

The present invention will now be described in greater detail, by way example only, with reference to the accompanying drawings, in which.

DETAILED DESCRIPTION

Figure 1:
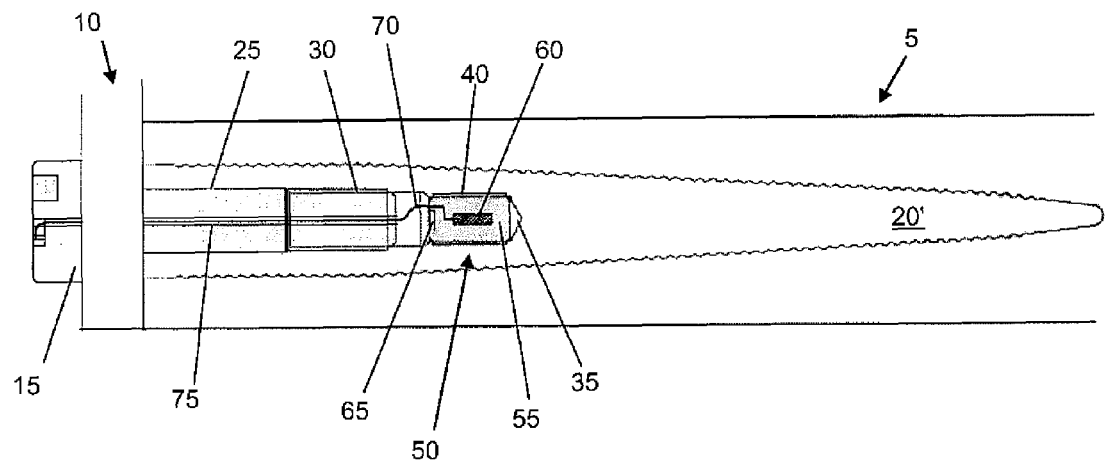
FIG. 1 illustrates a portion of a wind turbine rotor blade having a load sensor mounted therewithin.

FIG. 1 illustrates a portion of a rotor blade 5 connected to a hub 10. The rotor blade 5 is typically made from composite materials which do not have appropriate properties for forming tapped holes therewithin for receiving fixing means such as bolts 15. In order to overcome this lack of structural integrity it is known to provide an insert 20 into a root portion of the rotor blade 5. A conventional insert 20 is generally made from metal such as steel, however other materials having suitable stiffness and machineability may be used.

In this embodiment a bore 25 is formed within the modified insert 20' for receiving a bolt 15. A portion 30 of the bore 25 is tapped such that a threaded portion is formed to cooperate with a correspondingly threaded portion of the bolt 15.

A recess 35 is formed within the bore 25. The recess 35 is provided with a further tapped portion 40 such that a sensor 50 can be located and secured therewithin.

The sensor 50 comprises a carrier member 55 and a sensing element 60 embedded within the carrier member 55. The carrier member 55 may be made from the same material as the insert e.g. a metal such as steel. Alternatively, a plastics material having sufficient stiffness properties may be used. In this embodiment, the carrier member 55 is substantially cylindrical, having a circular cross-section, however the carrier member 55 could be tapered or otherwise differently configured.

An outer surface of the carrier member 55 is provided with a thread to complement the threaded portion 40 of recess 35. A key way 65 is formed in one end of the carrier member 55 to enable the sensor 50 to be inserted into recess 35 by placing a tool within key way 65 and rotating the sensor 50 so that the corresponding threads interlock. The carrier member 55 could additionally or alternatively be bonded in place (e.g. using an adhesive) or a friction fit interface between the carrier member 55 and the recess 35 could be achieved.

By providing a secure interface between the carrier member 55 and the insert 20, any loading experienced by the rotor blade 5 and transmitted to insert 20 is directly transferred to the carrier member 55 for detection by the sensing element 60.

A wire 70 is connected to sensing element 60 for conveying signals generated by the sensing element 60 to a controller (not shown). The bolt 15 is provided with an internal bore 75 which accommodates wire 70, in use, so that it may pass out of the rotor blade 5. A power cable may also be routed through internal bore 75 to provide power to sensor 50.

Figure 2:
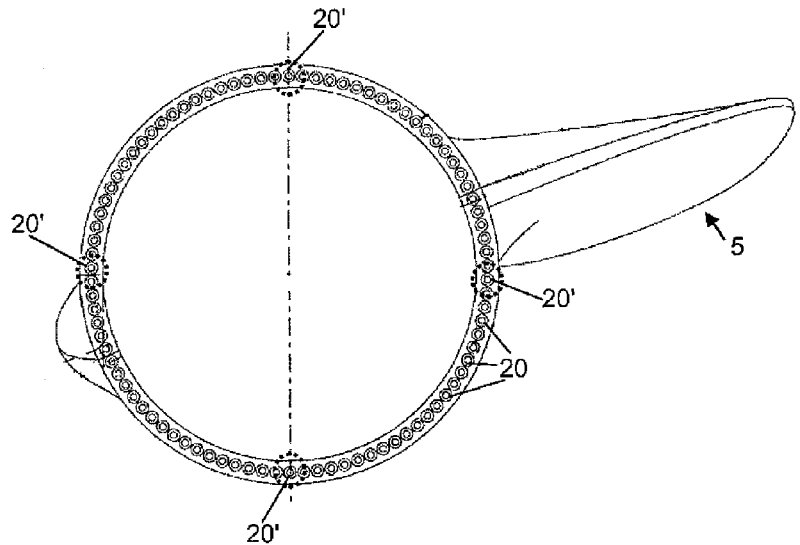
FIG. 2 illustrates a wind turbine rotor blade viewed from a root end.

FIG. 2 illustrates a root portion of rotor blade 5. A plurality of inserts 20 are positioned around the root portion. Each insert 20 is configured to receive fixing means, such as a bolt. Locations marked with a dashed circle represent modified inserts 20' which are configured to receive a sensor 50. In this embodiment, four sensors 50 are provided per rotor blade 5 to enable flap and edgewise bending loads to be monitored. However, it will be noted that fewer sensors may be provided or, indeed, a greater number of sensors 50 may be provided to achieve redundancy in the event of failure of one or more of the sensing elements 60 and/or to establish a more comprehensive representation of the loading experienced by the root of the rotor blade 5.

The load sensing element 60 may be provided by a resistive strain gauge, a fibre optic strain gauge or any other known strain sensing method.

Figure 3:
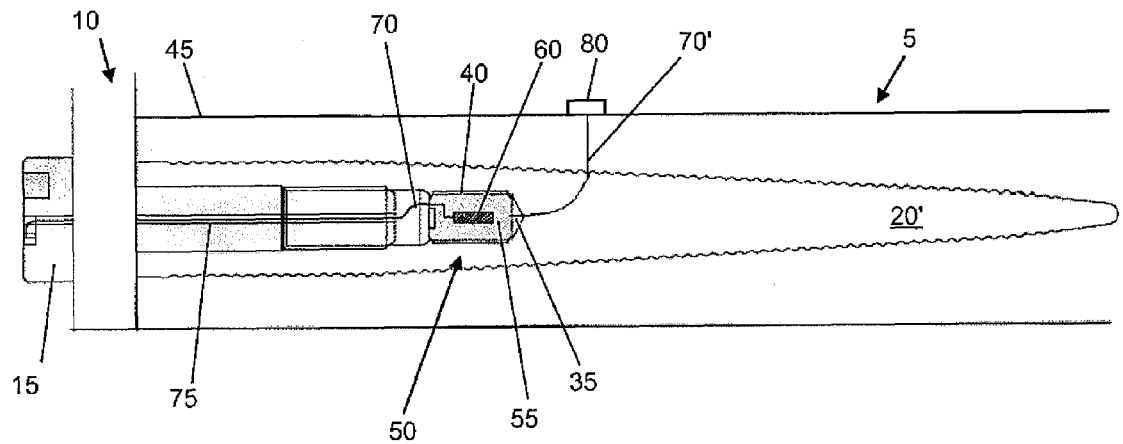
FIG. 3 illustrates an alternative embodiment of a load sensor.

In the previous embodiment, the sensing element 60 communicated with the controller via a wire 70 running through an internal bore 75 in bolt 15. However, as illustrated in FIG. 3 a wire 70' may be embedded within the rotor blade 5 extending between an inner surface 45 of a shell of the rotor blade 5 and the recess 35. The wire 70' may be provided with a contact surface at the recess 35 so that the sensing element 60 can communicate through wire 70' to a communication module 80, surface mounted on internal surface 45 of the rotor blade 5. Alternatively, communication module 80 may be embedded within the composite material of rotor blade 5. Wires may then be connected to module 80 and passed to the controller. Power may still be supplied through a cable routed through bore 75 of the bolt 15 or, alternatively, a power cable may be routed alongside wire 70'.

In an alternative embodiment, communication between the sensing element 60 and the controller may be achieved through a wireless connection, either directly from the sensing element 60 or from communication module 80.

Power is, preferably delivered to the sensing element through a wire 70, 70' but, alternatively, may be provided using a power scavenger which generates energy from the motion of the rotor blade itself or through electromagnetic radiation.

The invention has been described with reference to specific examples and embodiments. However, it should be understood that the invention is not limited to a particular example disclosed herein but may be designed and altered within the scope of the invention and in accordance with the claims.

The invention claimed is:

1. A wind turbine rotor blade root load sensor, comprising:
    an insert configured to be secured within a root portion of a wind turbine rotor blade, the insert including an internal bore;
    a carrier member fixedly connected to the internal bore of the insert so that loads can be transmitted therebetween; and
    a sensing element supported by the carrier member within the internal bore of the insert, the sensing element positioned to detect loads applied to the wind turbine rotor blade and transferred through the insert and the carrier member.

2. A load sensor according to claim 1, wherein the sensing element is embedded within the carrier member.

3. A load sensor according to claim 1, wherein the carrier member is substantially cylindrical.

4. A load sensor according to claim 1, wherein the carrier member includes an outer surface having a threaded portion.

5. A load sensor according to claim 4, wherein the internal bore of the insert includes a recess with a tapped portion, the tapped portion engaging the threaded portion of the carrier member when the carrier member is fixedly connected to the internal bore.

6. A load sensor according to claim 1, wherein the sensing element is a resistive strain gauge.

7. A wind turbine rotor blade, comprising:
    a root portion;
    a tip portion extending from the root portion;
    an insert coupled to the root portion and including an internal bore;
    a carrier member fixedly connected to the internal bore of the insert so that loads can be transmitted therebetween; and
    a sensing element supported by the carrier member within the internal bore of the insert, the sensing element positioned to detect loads applied to the wind turbine rotor blade and transferred through the insert and the carrier member.

8. A wind turbine rotor blade according to claim 7, wherein the sensing element is permanently mounted within the insert.

9. A wind turbine rotor blade according to claim 8, wherein the sensing element is bonded to the insert.

10. A wind turbine rotor blade according to claim 7, wherein the sensing element is removably mounted within the insert.

11. A wind turbine rotor blade according to claim 7, wherein the carrier member includes an outer surface having a threaded portion, and the internal bore of the insert includes a recess with a tapped portion, the tapped portion engaging the threaded portion of the carrier member when the carrier member is fixedly connected to the internal bore.

12. A wind turbine, comprising:
    a tower;
    a hub mounted atop the tower; and
    a rotor blade including:
        a root portion;
        a tip portion extending from the root portion;
        an insert coupled to the root portion and including an internal bore;
        a carrier member fixedly connected to the internal bore of the insert so that loads can be transmitted therebetween; and
        a sensing element supported by the carrier member within the internal bore of the insert, the sensing element positioned to detect loads applied to the wind turbine rotor blade and transferred through the insert and the carrier member, wherein the rotor blade is connected to the hub by at least one bolt, the bolt engaging the internal bore of the insert.

13. A wind turbine according to claim 12, wherein the carrier member includes an outer surface having a threaded portion, and the internal bore of the insert includes a recess with a tapped portion, the tapped portion engaging the threaded portion of the carrier member when the carrier member is fixedly connected to the internal bore.

* * * * *